United States Patent
Chen

(10) Patent No.: US 10,958,988 B2
(45) Date of Patent: Mar. 23, 2021

(54) METHODS AND APPARATUS FOR MEDIA CONTENT ASSET CHANGES

(71) Applicant: MediaTek Inc., Hsin-Chu (TW)

(72) Inventor: Lulin Chen, San Jose, CA (US)

(73) Assignee: MediaTek Inc., Hsin-Chu (TW)

(*) Notice: Subject to any disclaimer, the term of this patent is extended or adjusted under 35 U.S.C. 154(b) by 0 days.

(21) Appl. No.: 15/927,454

(22) Filed: Mar. 21, 2018

(65) Prior Publication Data

US 2018/0279013 A1    Sep. 27, 2018

Related U.S. Application Data

(60) Provisional application No. 62/619,175, filed on Jan. 19, 2018, provisional application No. 62/529,495, (Continued)

(51) Int. Cl.
*H04N 21/234* (2011.01)
*H04N 21/845* (2011.01)
(Continued)

(52) U.S. Cl.
CPC ......... *H04N 21/845* (2013.01); *H04N 19/107* (2014.11); *H04N 19/142* (2014.11);
(Continued)

(58) Field of Classification Search
CPC .... H04L 67/06; H04N 21/848; H04N 19/107; H04N 21/6332; H04N 21/845;
(Continued)

(56) References Cited

U.S. PATENT DOCUMENTS 6,380,991 B1    4/2002  Teichmer
2015/0032845 A1*  1/2015  Bouazizi ............... H04L 67/06
                                                                709/217
(Continued)

FOREIGN PATENT DOCUMENTS

CN       105264846 A        1/2016
WO    WO 2017/038065 A1     3/2017
WO    WO-2017209574 A1 *  12/2017  ......... H04N 21/435

OTHER PUBLICATIONS

No Author Listed, Information Technology—High efficiency coding and media delivery in heterogeneous environments—Part 1: MPEG media transport (MMT), International Standard, ISO/IEC FDIS 23008-1, ISO/IEC/JTC 1/SC29, 2016, 154 pages.
(Continued)

*Primary Examiner* — Albert Kir
(74) *Attorney, Agent, or Firm* — Wolf, Greenfield & Sacks, P.C.

(57) ABSTRACT

The techniques described herein relate to methods, apparatus, and computer readable media configured to process asset change point locations. A processor or encoder is configured to operate according to a set of constraints that constrain the encoding process for asset changes, wherein the set of constraints configures a set of allowable asset change point locations from a set of possible asset change point locations, wherein the set of allowable asset change point locations is a subset of the set of possible asset change point locations, and configures a set of allowable data access types from a set of possible data access types, wherein the set of allowable data access types is a subset of the set of possible data access types. Video data is encoded based on the set of constraints to generate encoded first video data, such that the encoded first video data comprises a set of asset
(Continued)

change point locations and associated data access types in compliance with the set of constraints.

22 Claims, 10 Drawing Sheets

Related U.S. Application Data filed on Jul. 7, 2017, provisional application No. 62/475,945, filed on Mar. 24, 2017.

(51) Int. Cl.
| | |
|---|---|
| *H04N 21/44* | (2011.01) |
| *H04N 19/107* | (2014.01) |
| *H04N 19/142* | (2014.01) |
| *H04N 19/172* | (2014.01) |
| *H04N 21/2343* | (2011.01) |
| *H04N 21/854* | (2011.01) |
| *H04N 19/70* | (2014.01) |

(52) U.S. Cl.
CPC ..... *H04N 19/172* (2014.11); *H04N 21/23424* (2013.01); *H04N 21/23439* (2013.01); *H04N 21/8455* (2013.01); *H04N 21/85406* (2013.01); *H04N 19/70* (2014.11)

(58) Field of Classification Search
CPC ............... H04N 19/142; H04N 19/172; H04N 21/23424; H04N 21/23439; H04N 21/8455; H04N 21/85406; H04N 19/70
USPC ...................................... 375/240.26; 709/217
See application file for complete search history.

(56) References Cited

U.S. PATENT DOCUMENTS

| | | |
|---|---|---|
| 2018/0262784 A1 | 9/2018 | Chen et al. |
| 2019/0222904 A1* | 7/2019 | Park ................ H04N 21/23424 |

OTHER PUBLICATIONS

International Search Report and Written Opinion dated Jun. 19, 2018 in connection with International Application No. PCT/CN2018/080412.
[No Author Listed], Seamless splicing for MPEG-2 bit streams. Series J: Cable Networks and Transmission of Television, Sound Programme and Other Multimedia Signals. ITU.T, J.189. Jul. 31, 2002. 18 pages.
[No Author Listed], for Television—Splice points for MPEG-2 Transport Streams. SMPTE Standard. SMPTE 312M-1999. Apr. 8, 1999; 20 pages.
International Preliminary Report on Patentability for International Application No. PCT/CN2018/080412 dated Oct. 3, 2019.
[No Author Listed], Information technology—Coding of audio-visual objects, Part 12: ISO base media file format. International Standard, ISO/IEC 14496-12, Fifth Edition. Feb. 20, 2015:250 pages.
[No Author Listed], Information technology—High efficiency coding and media delivery in heterogeneous environments—Part 13: 3rd Edition MPEG Media Transport Implementation Guidelines. WD of ISO/IEC 23008-13 3rd Edition MPEG Media Transport Implementation Guideline, ISO/IEC JTC1/SC29/WG11, Feb. 2017:1-139.
Lee et al., ISO/IEC 23008-1:2018 FDAM 2 Enhancements for Mobile Environments. International Organisation for Standardisation, Coding of Moving Pictures and Audio, ISO/IEC JTC1/SC29/WG11 MPEG/w17196. Oct. 2017:75 pages.

* cited by examiner

| Syntax | Value | No. of bits |
|---|---|---|
| ACR_message () { | | |
|   message_id | | 16 |
|   version | | 8 |
|   length | | 16 |
|   message_payload{ | | |
|     target_MMT_package_id{    ← 202 | | |
|       MMT_package_id_length | N1 | 8 |
|       for (i=0; i<N1; i++) { | | |
|         MMT_package_id_byte | | 8 |
|       } | | |
|     } | | |
|     number_of_assets    ← 204 | N2 | 8 |
|     for (i=0; i<N2; i++) {    ← 206 | | |
|       target_asset_id()    ← 208 | | |
|       target_asset_type | | 32 |
|       duration | | 32 |
|       change_type    ← 210 | | 8 |
|       change_indicate_mode    ← 212 | | 8 |
|       if (change_indicate_mode == 0x01) { | | |
|         UTC_timestamp | | 32 |
|       } | | |
|       else if (change_indicate_mode == 0x02) { | | |
|         mpu_sequence_number | | 32 |
|       } | | |
|       else if (change_indicate_mode == 0x03) { | | |
|         mpu_timestamp_descriptor() | | |
|       } | | |
|       designated_MMT_general_location_info() | | |
|     } | | |
|     reserved | '1111 111' | 7 |
|     private_extension_flag | | 1 |
|     if (private_extension_flag == 1) { | | |
|       private_extension { | | |
|       } | | |
|     } | | |
|   } | | |
| } | | |

FIG. 2

| Type | Description |
|---|---|
| 0x00 | Reserved |
| 0x01 | Replace the target Asset with designated Asset. |
| 0x02 | Overlay designated Asset on the target Asset with an alpha blending mode. |
| 0x03 | Insert before the target Asset with designated Asset |
| 0x04–0xFF | Reserved |

FIG. 3

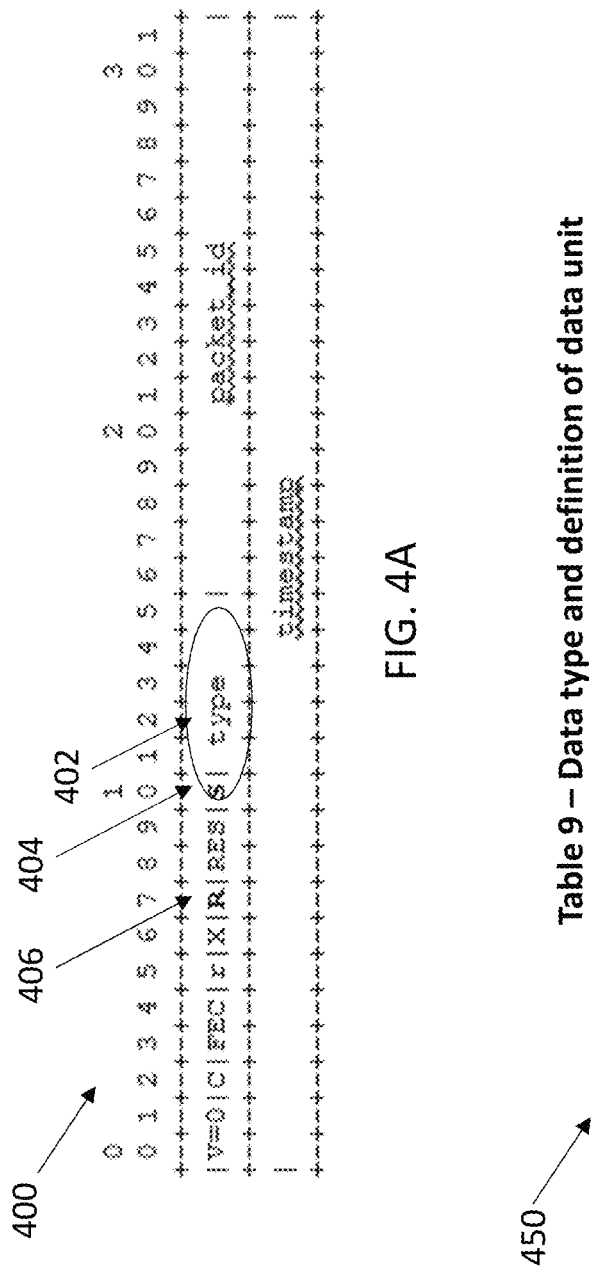

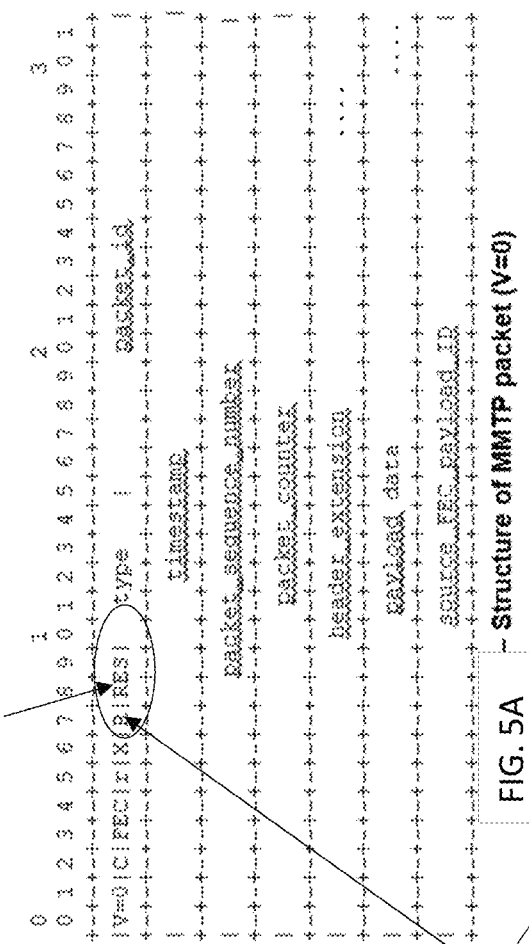
FIG. 5A — Structure of MMTP packet (V=0)
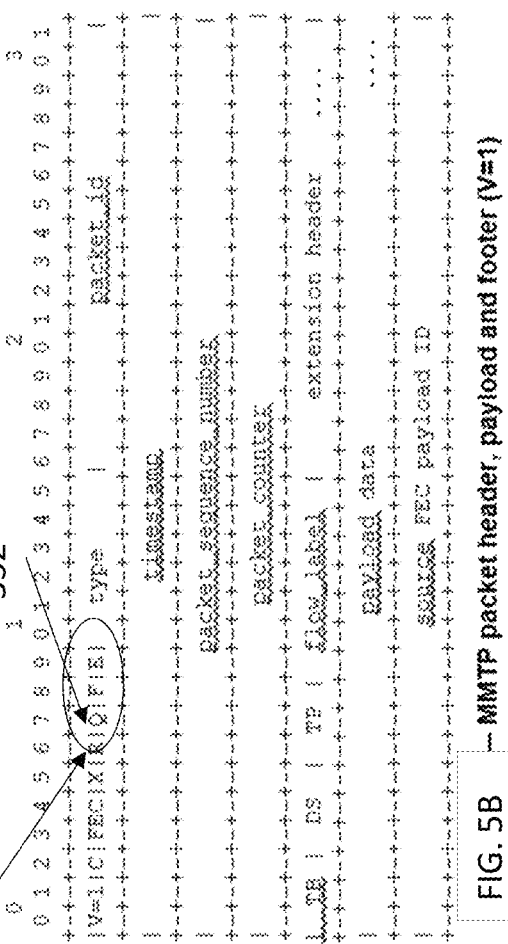
FIG. 5B — MMTP packet header, payload and footer (V=1)

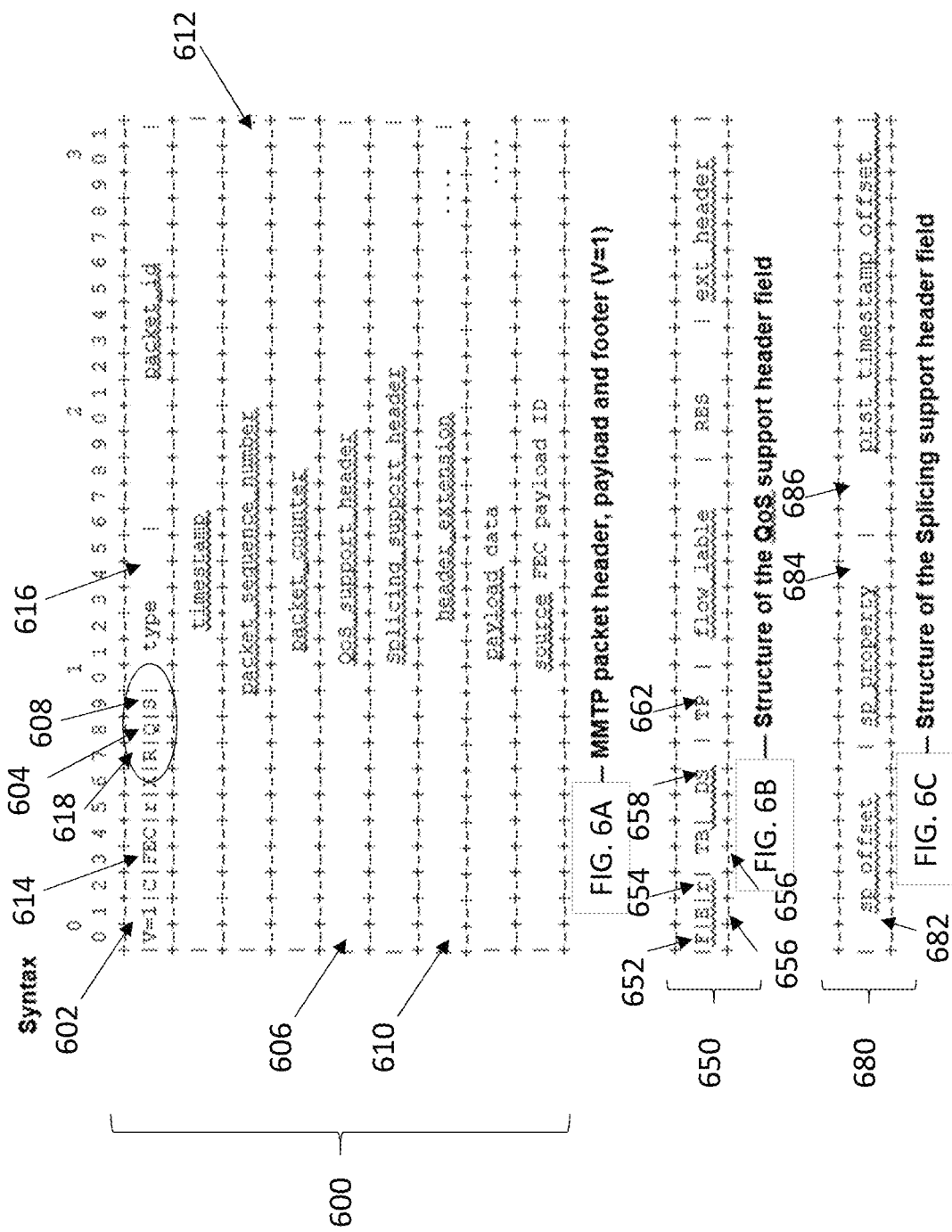

| FT | Description | Content |
|---|---|---|
| 0 | MPU metadata | Contains the ftyp, mmpu, moov and meta boxes as well as any other boxes that appear in between. |
| 1 | Movie fragment data | Contains the moof box and the mdat box, excluding all media data inside the mdat box but including any chunks of auxiliary sample information. |
| 2 | MFU | Contains a sample or sub-sample of timed media data or an item of non-timed media data. |
| 3 | MFU as a splicing point | Contains a sync sample of the first sub-sample of a sync sample of timed media data. |
| 4~15 | Reserved for private use | Reserved |

FIG. 9

METHODS AND APPARATUS FOR MEDIA CONTENT ASSET CHANGES

RELATED APPLICATIONS

This Application claims priority under 35 U.S.C. § 119(e) to U.S. Provisional Application Ser. No. 62/475,945, entitled "METHOD AND APPARATUS OF SPLICING INFORMATION SIGNALING FOR MMT," filed on Mar. 24, 2017, 62/529,495, entitled "METHOD AND APPARATUS OF SIGNALING OF SPLICING POINTS WITH CONSTRAINTS FOR THE ACR MESSAGE," filed on Jul. 7, 2017, and 62/619,175, entitled "CONSTRAINTS AND RAP_FLAG FOR SPLICING POINT SIGNALING," filed Jan. 19, 2018, which are herein incorporated by reference in their entirety.

TECHNICAL FIELD

The techniques described herein relate generally to performing asset changes of media content, including constraints used for splicing and signaling information related to splicing and splicing points.

BACKGROUND OF INVENTION

MPEG-H is a group of standards being developed by the ISO/IED Motion Picture Experts Group (MPEG), and is often referred to as ISO/IEC 23008. MPEG-H includes a number of different parts. MPEG-H standards include a digital format/container standard, a video compression standard, and an audio compression standard. Part 1 (MPEG-H Part 1 (ISO/IEC 23008-1)) is the MPEG media transport (MMT)) part. The MMT technology is for the transport and delivery of coded media data for multimedia services over heterogeneous packet-switched networks. MMT deployments can include, for example, traditional broadcast TV service and internet streaming. To support desired business models for such services, advanced splicing features are needed beyond those supported by MPEG-H, such as to support advertisement (Ad) insertion (e.g., pre-roll and mid-roll ad insertion), program editing, and program switching. However, existing techniques may not provide and/or support sufficient splicing capabilities needed by encoding devices to support these services. For example, encoding devices may need to perform compression encoding, FEC encoding, and/or MMTP packetizing.

SUMMARY OF INVENTION

In accordance with the disclosed subject matter, apparatus, systems, and methods are provided for encoding video data. An encoding module, encoder, and/or the like, is configured to operate according to a set of constraints that constrain the encoding process for asset changes, wherein the set of constraints configures a set of allowable asset change point locations from a set of possible asset change point locations, wherein the set of allowable asset change point locations is a subset of the set of possible asset change point locations, and configures a set of allowable data access types from a set of possible data access types, wherein the set of allowable data access types is a subset of the set of possible data access types. Video data is encoded based on the set of constraints to generate encoded first video data, such that the encoded first video data comprises a set of asset change point locations and associated data access types in compliance with the set of constraints.

In some examples, configuring the encoding module to operate according to the set of constraints that constrain the encoding process for asset changes includes configuring the set of allowable asset change point locations to be asset change points at Media Processing Unit (MPU) boundaries, and configuring the set of allowable data access types such that a first target MPU, a first designated MPU, or both, start with a stream access point (SAP) of a set of specified types. The set of specified SAP types can include a first type, in which all access units, in decoding order, can be correctly decoded, and an access unit in decoding order is also the first access unit in presentation order, and a second type in which the first access unit in decoding order in the media stream is not the first access unit in presentation order. A flag can be set to mark a first SAP of the MPU.

In some examples, configuring the encoding module to operate according to the set of constraints that constrain the encoding process for asset changes includes configuring the set of allowable asset change point locations to be asset change points at a start of a stream access point (SAP), and configuring the set of allowable data access types such that a first target SAP, a first designated SAP, or both, are of a set of specified types. The set of specified SAP types includes a first type, in which all access units, in decoding order, can be correctly decoded, and an access unit in decoding order is also the first access unit in presentation order, and a second type in which the first access unit in decoding order in the media stream is not the first access unit in presentation order. A flag can be set to mark each SAP in the MPU.

In some examples, encoding includes encoding data to signal the set of asset change point locations. Encoding data can include encoding data regarding the set of asset change point locations in the MPEG media transport protocol (MMTP) packet header. Encoding can include setting a random access point flag for the MMTP packet header of each packet associated with each asset change point location in the set of asset change point locations.

Some embodiments relate to a method for encoding video data. Video data can be encoded to generate encoded video data. A set of asset change point locations are determined in the encoded video data. One or more fields are set at the Moving Picture Experts Group (MPEG) media transport protocol (MMTP) packet level to signal the set of asset change point locations, such that a receiving device can use the signaled information at the MMTP packet level to determine the set of asset change point locations to perform an asset change.

In some examples, setting the one or more fields includes setting a bit in a type field of an MMTP packet header of each packet associated with each asset change point location in the set of asset change point locations.

In some examples, setting the one or more fields includes setting a plurality of bits of an MMTP packet header of each packet associated with each asset change point location in the set of asset change point locations.

In some examples, setting the one or more fields includes setting a bit in an MMTP payload header of each packet associated with each asset change point location in the set of asset change point locations.

In some examples, setting the one or more fields includes signaling a value of a Media Processing Unit (MPU) fragment type.

Some embodiments relate to an apparatus for encoding video data. The apparatus includes a processor in communication with memory, the processor being configured to execute instructions stored in the memory that cause the processor to configure the processor to operate according to a set of constraints that constrain the encoding process for asset changes, wherein the set of constraints configures a set of allowable asset change point locations from a set of possible asset change point locations, wherein the set of allowable asset change point locations is a subset of the set of possible asset change point locations, and configures a set of allowable data access types from a set of possible data access types, wherein the set of allowable data access types is a subset of the set of possible data access types. The instructions cause the processor to encode video data based on the set of constraints to generate encoded first video data, such that the encoded first video data comprises a set of asset change point locations and associated data access types in compliance with the set of constraints.

In some examples, configuring the processor to operate according to the set of constraints that constrain the encoding process for asset changes includes configuring the set of allowable asset change point locations to be asset change points at Media Processing Unit (MPU) boundaries, and configuring the set of allowable data access types such that a first target MPU, a first designated MPU, or both, start with a stream access point (SAP) of a set of specified types.

In some examples, configuring the processor to operate according to the set of constraints that constrain the encoding process for asset changes includes configuring the set of allowable asset change point locations to be asset change points at a start of a stream access point (SAP), and configuring the set of allowable data access types such that a first target SAP, a first designated SAP, or both, are of a set of specified access types.

In some examples, encoding includes encoding data to signal the set of asset change point locations.

Some embodiments relate to an apparatus for performing an asset change for video data. The apparatus includes a processor in communication with memory, the processor being configured to execute instructions stored in the memory that cause the processor to receive encoded video data, determine, based on one or more fields at the Moving Picture Experts Group (MPEG) media transport protocol (MMTP) packet level, a set of asset change point locations, and perform, using one or more asset change point locations from the set of asset change point locations, an asset change operation.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 2 shows an example of an exemplary asset change request (ACR) message syntax, according to some examples.

FIG. 3 shows a table of exemplary change type values for the change type field in an ACR message, according to some examples.

FIG. 4A shows a portion of an exemplary MPEG Media Transport Protocol (MMTP) packet header, according to some embodiments.

FIG. 4B shows a table with exemplary values of the type field, according to some examples.

FIG. 5A shows a first version of the MMTP packet structure, according to some examples.

FIG. 5B shows a second version of the MMTP packet structure, according to some examples.

FIG. 6A shows an exemplary syntax to signal splicing information, according to some embodiments.

FIG. 6B shows an example syntax for the QoS support header, according to some embodiments.

FIG. 6C shows an exemplary syntax for the splicing support header field, according to some embodiments.

FIG. 9 shows a table of exemplary values for the FT field, according to some embodiments.

DETAILED DESCRIPTION OF INVENTION

The techniques discussed herein can be used to support robust splicing capabilities. Splicing can be used to concatenate, at the MMT system level, two different MMT Assets such that the resulting MMT packages are conformant to the MMT standard. The applicants have appreciated that existing MPEG-H splicing support is inadequate to provide for the proper range of splicing capabilities and support needed for existing services (e.g., for various advertisement (ad) insertions, such as pre-roll and mid-roll, program editing, switching, etc.). For example, the applicants have appreciated that current splicing support does not provide for sufficient and robust Asset signaling for splicing, including for these desired services. As another example, the applicants have appreciated that splicing two different data streams or MMT assets may require handling and/or signaling decoding dependencies, decoding delay and decoder buffer issues (e.g., buffer overflow), and/or handling quality continuity before and/or after the splicing point. As discussed further herein, the applicants have developed techniques, including constraint techniques as well as signaling techniques, that improve and advance existing splicing technology in a manner that provides for advanced splicing capabilities not achievable using current technologies.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
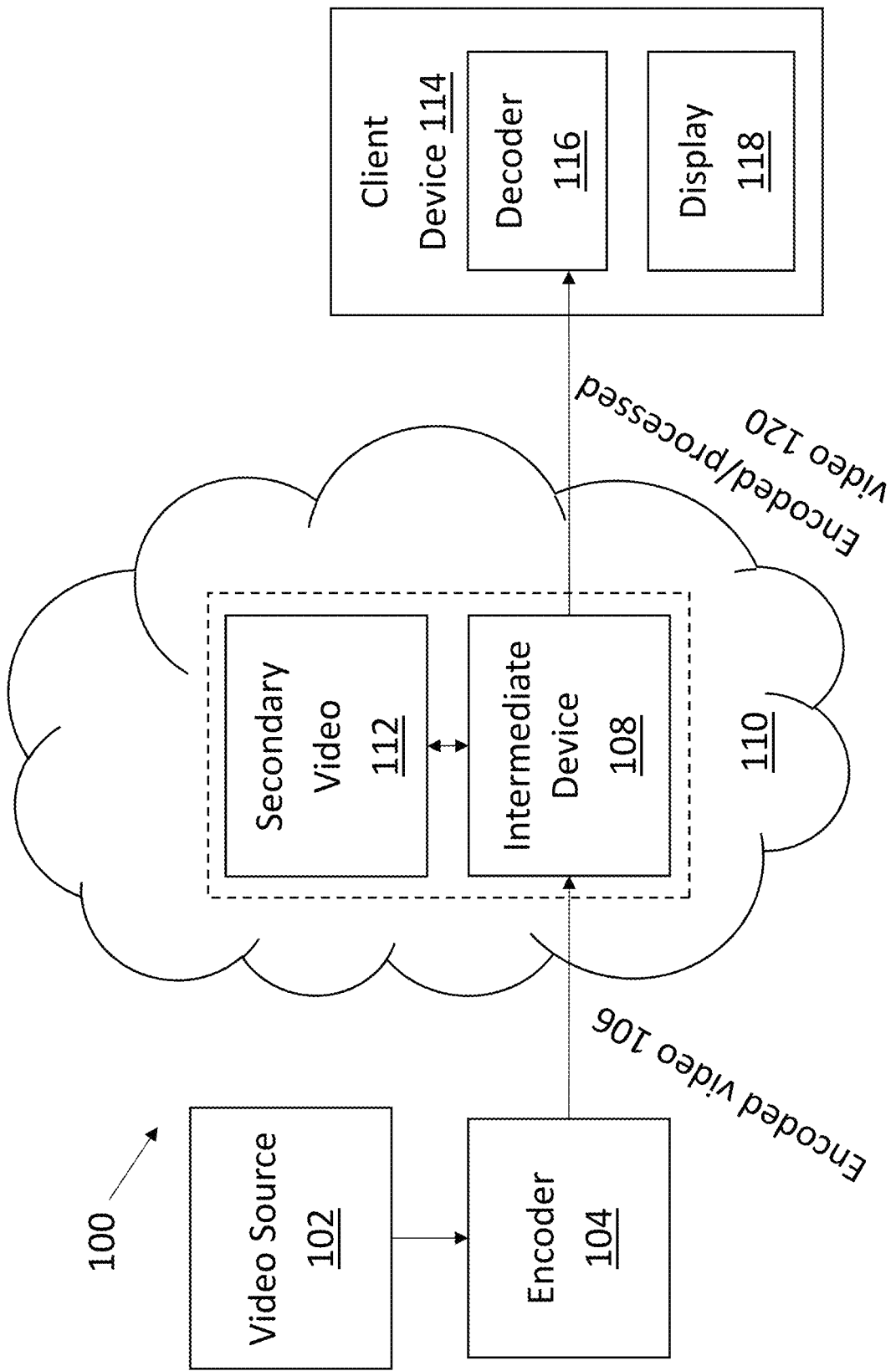
FIG. 1 shows an exemplary video transport and delivery configuration, according to some embodiments.

FIG. 1 shows an exemplary video transport and delivery configuration 100, according to some embodiments. Video source 102 can be any type of video source, such as a cell phone, a camera (e.g., cameras that include audio recording capabilities, and/or separate cameras and audio recording functionality), stored video data, computer-generated graphics, and/or the like. Encoder 104 encodes the video source into encoded video. The encoder 104 can reside on the same device that generated the video source 102, and/or may reside on a different device. The encoder 104 transports encoded video 106 to the intermediate device 108 via the network 110. The intermediate device 108 can be, for example, an MMT aware device and/or other device capable of performing video processing operations, such as splicing. The intermediate device 108 may be operated by, for example, a regional operator. The network can be, for example, a heterogeneous network, such as the Internet, a broadcast network, a mobile network (e.g., a cellular network), and/or the like. The intermediate device 108 is in communication with (and/or includes, e.g., in memory residing on the intermediate device 108) secondary video 112. As discussed further herein, the intermediate device 108 processes (e.g., splices) the encoded video 106 based on the secondary video 112 and/or additional data to generate encoded and processed video 120. The intermediate device 108 may operate as a receiving device to receive the encoded video 106 (and/or messages, not shown) from the encoder 104. In some embodiments, the intermediate device 108 performs FEC decoding and/or encoding, as discussed further herein.

The client device 114 receives the encoded/processed video 120 from the intermediate device 108 via the network 110. The client device 114 includes a display 118 for displaying the decoded video. In some other embodiments, the client device may be connected to the display 118, which is configured to display the decoded video. The client device 114 can be, for example, a computer, a cell phone, a set top box, a television, and/or any other device configured to receive and play the encoded/processed video 120. The client device 114 includes a decoder 116 that is configured to decode the encoded video.

Media components are processed into an MMT-specified format called the Media Processing Unit (MPU), which defines the content logical structure and the physical encapsulation format based on the ISO Base Media File Format (ISOBMFF) file format. An MMT Asset may consist of one or more MPUs. The MMT Packages that consist of one or more MMT Assets are packetized for delivery. The intermediate devices 108 can be an MMT aware device that can handle asset changes, e.g., including adding local ads. The intermediate devices 108 can be operated by a regional office. Asset changes are typically transparent to the client device 114, such as a client. In other words, typically the client device 114 may not be aware of any asset changes.

Splicing can be supported by adding an Asset Change Request (ACR) message, as is described in ISO/IEC 23008-1:201x DAM2 Enhancement for Mobile Environments," W16648, January, 2017, Geneva, Switzerland, which is hereby incorporated by reference herein in its entirety. The ACR message can be included to support asset changes or splicing processing. The ACR message can be used, for example, to signal and set target assets with various parameters. In the MMT context, asset changes or splicing can be performed to concatenate, on the MMT system level, two different MMT Assets and the resulting MMT packages are conformant to the MMT standard. When an MMT-aware Network Entity ("MANE") or splicing device receives the ACR message as a change event, it can be configured to perform the processing accordingly. The device can use a local Asset (e.g., a local ad using local content), or use a third party ad (e.g., by retrieving the content from a URL).

The ACR message can signal the change event with various parameters, including the target MMT package id, the target asset id, the change type, the change indicate mode, etc. FIG. 2 shows an example of an exemplary asset change request (ACR) message syntax 200, according to some examples. The syntax 200 includes a target MMT package identifier target_MMT_package_id 202 (e.g., which indicates the identifier of the target package to be changed), the target asset identifier target_asset_id 204 (e.g., which indicates the identifier of the Asset to be changed), the target asset type target_asset_type 206 (e.g., which provides the type of the Asset to be changed), the duration 208 (e.g., which indicates the change time duration in milliseconds starting at the time which is specified in the change_indicate_mode field, discussed below), the change type change_type 210 (e.g., which indicates the type of media change on the target Asset which is indicated by target_asset_id), and the change_indicate_mode change_indicate_mode 212 (e.g., which can define how to indicate the time at which the media change occurs).

The ACR message may include other fields not shown in FIG. 2. For example, the ACR message may include error correction information (e.g., FEC information such as an FEC_clean_type) that can be used to avoid unnecessary error correction processing. For example, if the error correction does not take into account the underlying data structure, error correction processing is likely required to process the data units (e.g., in order to perform the splicing). However, error correction processing can be avoided if the error correction takes into account the underlying data structure. The ACR message may include a field, such as the FEC_clean_type field, to signal to the splicing device whether the error correction for the source and/or destination content is data unit boundary aware, such that the forward error correction does not overlap data unit boundaries and therefore error correction processing can be skipped to perform the asset change.

FIG. 3 shows a table 300 of exemplary change type values for the change_type 210 field in an ACR message, according to some examples. The values, or types, of 0x00 and 0x04 through 0xFF can be reserved, such as for future use. A value of 0x01 can be used to indicate that the receiving device should replace the target Asset with designated Asset. A value of 0x02 can be used to indicate that the receiving device should overlay the designated Asset on the target Asset with an alpha blending mode. In the case of a value of 0x02, the overlay location of the designated Asset can be provided by a PI document, such as the MPEG Composition Information (CI) document, a layout configuration table as defined in the standard, and/or the like. A value of 0x03 can be used to perform an insertion before the target Asset with the designated Asset. The insertion type can be used, for example, to support use cases of pre-roll or mid-roll of Ad insertion (e.g., since otherwise existing splicing capabilities are typically limited to replacing a target asset with a designated asset, or overlying an asset on a target asset).

In some examples, a primary MMT sending entity that initiates the MMT session for MMT applications sends the ACR message. When an MMT-aware Network Entity ("MANE") or an MMT middle box receives the ACR message, it processes the ACR message. For example, if the ACR message includes parameters related to error correction (e.g., FEC_clean_type), the device performs any FEC processing signalled by FEC_clean_type. The device then locates the changing point in the target asset via the random access information (e.g., the RAP_flag, as discussed further below) in the MMTP packet, and performs the requested change with the designated asset in terms of the specified settings in the ACR message.

The techniques described herein can be configured to impose constraints on MMT assets that are used for changing points or splicing points. The constraints can, for example, be configured to provide for improved splicing results than otherwise achievable using existing splicing technologies, including for ordinary splicing and seamless splicing.

In some embodiments, constraints can be imposed for asset changes at the start of an MPU. For a single MPU Asset (e.g., an Asset that only occupies a single MPU), an Asset change at the start of MPU is the same as an Asset change at the start of such an Asset. It usually generates a smaller size of the Asset. As a general matter, an MMT Asset may contain multiple MPUs, and an MPU starts with a stream access point ("SAP"). A SAP is explained in, for example, the "ISO Base Media File Format," ISO/IEC 14496-12, Fifth edition, February 2015, which is hereby incorporated by reference herein in its entirety. A SAP enables random access into a container of media streams. Additionally, an MPU may contains multiple SAPs with different SAP types, such as Type 1, Type 2, Type 3, and/or the like.

The SAP Types can range, for example, from Type 1 through Type 6, as discussed in ISO/IEC 14496-12. In particular, ISO/IEC 14496-12 states that Type 1 corresponds to what is known in some coding schemes as a "Closed GoP random access point" (in which all access units, in decoding order, starting from $I_{SAP}$ can be correctly decoded, resulting in a continuous time sequence of correctly decoded access units with no gaps) and in addition the access unit in decoding order is also the first access unit in presentation order. Type 2 corresponds to what is known in some coding schemes as a "Closed GoP random access point", for which the first access unit in decoding order in the media stream starting from $I_{SAU}$ is not the first access unit in presentation order. Type 3 corresponds to what is known in some coding schemes as an "Open GoP random access point", in which there are some access units in decoding order following $I_{SAU}$ that cannot be correctly decoded and have presentation times less than $T_{SAP}$. Type 4 corresponds to what is known in some coding schemes as an "Gradual Decoding Refresh (GDR) random access point", in which there are some access units in decoding order starting from and following $I_{SAU}$ that cannot be correctly decoded and have presentation times less than $T_{SAP}$. Type 5 corresponds to the case for which there is at least one access unit in decoding order starting from $I_{SAP}$ that cannot be correctly decoded and has presentation time greater than $T_{DEC}$ and where $T_{DEC}$ is the earliest presentation time of any access unit starting from $I_{SAU}$. Type 6 corresponds to the case for which there is at least one access unit in decoding order starting from $I_{SAP}$ that cannot be correctly decoded and has presentation time greater than $T_{DEC}$ and where $T_{DEC}$ is not the earliest presentation time of any access unit starting from $I_{SAU}$.

For MMT Asset change points that occur at the MPU boundaries, the asset change-in point can be the point right before the first target MPU in the first target asset (e.g., of a set of target assets). The asset change-out point can be the point immediately after the last target MPU in the last target asset. The asset changing point can be either the asset change-in point or the asset change-out point. The description herein uses the phrases "asset splicing points" and "asset changing points" interchangeably. For example, the phrases "splice-in point" and "splice-out point" may be used for "asset change-in point" and "asset change-out point," respectively. A MANE or other device performing the asset change may be viewed interchangeably as a splicing device or splicer.

The change type in an ACR can indicate the type of media change on the target Asset. In some embodiments, constraints can be imposed for the change type. For example, the first target MPU and/or the first designated MPU can be constrained to start with a SAP of Type 1 or Type 2. Starting with either Type 1 or Type 2 can provide, for example, for a clean splice processing beginning from the asset change-in point (before the first target asset) through the asset change-out point (after the last target asset). In some examples, the asset change-in point and the asset change-out point may be at the same place, e.g. for a change type of insertion. In some examples, if the MPU of the target asset or the designated asset starts with other SAP types, e.g. Type 3, splicing asset changes may still be possible but may be less desirable. For example, using other SAP types may cause complicated situations in the decoding/rendering process, such as rough decoding (e.g., erroneous decoding, depending on a MANE device's capability), timing mismatch, and/or the like.

In some embodiments, other constraints can be imposed for the different ACR change types. For example, a constraint can be imposed such that for an ACR change type of an asset replacement (e.g., of type 0x01 in table 300 in FIG. 3), MPU(s) may be constrained to certain SAP types. For example, the first MPU of the designated asset can be constrained to start with a SAP type, and/or the first MPU of the asset after the change-out point can be constrained to start with a certain SAP type. For example, the first MPU of the designated asset may be constrained to start with a SAP of Type 1 or Type 2, and/or the first MPU of the asset after the change-out point can be constrained to start with a SAP of Type 1 or Type 2.

In some embodiments, for the change type of insertion (e.g., 0x03 in table 300 in FIG. 3), a constraint can be imposed for the SAP type. For example, the first MPU after the change-in point and the first MPU of the designated asset can be constrained to start with a SAP of Type 1 or Type 2.

In some embodiments, for the change type of overlay (e.g., 0x02 in table 300 in FIG. 3), a constraint can be imposed for the SAP type. For example, the first MPU of the designated asset can be constrained to start with a SAP of Type 1 or Type 2.

In some embodiments, constraints can be imposed for asset changes at a point in the MPU. As noted above, for a single SAP MPU, an Asset change may be at the start of MPU. It usually generates a smaller size of the MPU. As discussed above, an MPU may contains multiple SAPs with different SAP types, such as Type 1, Type 2, Type 3, and/or the like.

In some embodiments, MMT Asset change points can occur at the start of a SAP in MPU. The "first target SAP" can be the first SAP point in the target Assets that is the change point for the Asset change. The "first designated SAP" can be the first SAP point in the designated Assets for the Asset change.

In some embodiments, a constraint can be imposed that the first target SAP and/or the first designated SAP are of a particular SAP type. For example, the first target SAP and/or the first designated SAP can be constrained to be of SAP Type 1 or Type 2.

In some embodiments, constraints can be imposed for particular change types. In some embodiments, for a change type of "replacement" (e.g., change_type=1), a constraint can be imposed that the first designated SAP shall be of Type 1 or Type 2, and the first target SAP after the change-out point shall be of Type 1 or Type 2. In some embodiments, for a change type of "overlay" (e.g., change_type=2), a constraint can be imposed that the first designated SAP shall be of Type 1 or Type 2. In some embodiments, for a change type of "insertion" (e.g., change_type=3), a constraint can be imposed that the first target SAP after the change-in point and the first designated SAP shall be of Type 1 or Type 2.

Data can be used to signal the splicing points for target assets, including splicing points at the start of an MPU and/or at a point in the MPU. In some embodiments, the MMTP packet header can be used to signal splicing points. In the MMTP packet header, there is a random access point (RAP) flag that can be used to indicate important data in the packet. In some embodiments, a splicing point can be a special case of the RAP flag. For example, the random access point (RAP) flag, RAP_flag "R," in the MMTP packet header can be used to signal a random access point of the data type contained in the MMTP packet. The RAP_flag R is shown in FIG. 4A, discussed further below. The MMT Implementation Guideline is the "WD of ISO/IEC 23008-13 $3^{rd}$ Edition MPEG Media Transport Implementation Guideline," w16658, February 2017, which is hereby incorporated by reference herein in its entirety. The Implementation Guideline explains that the RAP_flag may mark (for timed media), a signaling message, an MPU fragment type 0, an MPU fragment type 1, or an IRAP picture. An MPU fragment type 0 indicates that the packet contains MPU metadata, such as the ftyp, mmpu, moov, and meta boxes as well as any other boxes that appear in between. An MPU fragment type 1 indicates that the packet contains movie fragment metadata, such as the moof box and the mdat box, excluding all media data inside the mdat box but including any chunks of auxiliary sample information. An IRAP picture indicates the packet contains an I picture as a RAP. An IRAP picture may, as a Media Fragment Unit (MFU), appear in the middle of an MPU.

In some embodiments, the RAP_flag can be used to signal information related to splicing points when a constraint is imposed, as discussed herein. For example, for splicing points at the start of an MPU with a constraint as discussed herein, the RAP_flag may mark only the first SAP of the MPU. If the MPU size is large, the number of the splicing points may be limited. As another example, for splicing points at a point in the MPU with a constraint as discussed herein, the RAP_flag may mark each of the SAPs in the MPUs. This can generate a good number of splicing points. Some constraints may require all SAPs to start with Type 1 of Type 2, which may reduce video coding efficiency.

In some examples, the MMT sending entity may send periodic signaling messages. For example, the MMT sending entity may send signaling messages periodically before or after an MPU for low delay service and/or for fast MMT session acquisition. An MMT sending entity may send MPU fragments in a different order within an MPU period. In some examples, the RAP_flag may be used to mark packets for fast session acquisition for a RAP with IRAP picture of Type 1, Type 2, Type 3, and/or the like. Using the RAP_flag to signal for fast acquisition may repeat frequently to provide an easy tune-in for a service program. Such signaling may, or may not, result in (e.g., initially) a good visual quality depending on the capability of the receiving entity. For example, an MMT receiving entity may use the RAP_flag to tune-in and join a service, although if MPU fragments are out of order, at the point it joins it may or may not result in good visual quality depending on the performance of the receiving entity. A device's support for fast session acquisition and splicing may not be the same. Furthermore, seamless splicing support may need signalling of decoding delay, buffer fullness, and suitable bitrate for the splicing point.

In some embodiments, the type of picture may be restricted to use the RAP_flag to signal a splicing point using one or more constraints as discussed herein. For example, a marked IRAP picture may be constrained to be an IDR picture per AVC/HEVC, a Sync Sample per MPEG File Format, and/or the like. In some examples, an IDR picture is not considered to be a splicing point if the IDR picture is in the middle of MPU. In some embodiments, if RAP_flag marked pictures are all IDR pictures, then signaling a random access point can also signal a splicing point. In some examples, it may be desirable to leverage the frequency of IDR pictures. Frequent IDR pictures in a stream may affect coding efficiency, while periodic IRAP pictures in a stream (e.g., including in the middle of an MPU) can be desirable for easy random access. Therefore, in some embodiments, a random access point can be differentiated from a splicing point, including whether the splicing point is a seamless splicing point or an ordinary slicing point. In some examples, the RAP_flag can be used as a generic signaling mechanism for various data priorities. Not all random access points may be splicing points, such that in some embodiments the splicing points are a subset of the random access points. Further, some splicing points may be used for ordinary splicing, while others may be used for seamless splicing. Additional bit(s) can be used to signal whether the type of a particular splice point (e.g., for ordinary or seamless splicing).

It may be desirable to signal further information than can be signaled using the constraints discussed above and/or the RAP flag. In some embodiments, information regarding splicing points (e.g., and splicing point properties) can be signaled at the MMTP packet level. In some examples, such MMTP packet level signaling can be used in conjunction with delivery messages, such as ACR messages, as discussed herein. The splicing point information can be signaled in the MMTP packet using existing fields, and/or using new fields not in existing MMTP packet header configurations.

FIG. 4A shows a portion of an exemplary MMTP packet header 400, according to some embodiments. The header 400 includes a type field 402, which consists of five bits 11-15 in this non-limiting example. In some configurations, the type field 402 may include an additional bit, such as bit 10 which is shown in FIG. 4A as the "S" flag 404. Therefore, as shown in FIG. 4A, in some embodiments the first bit of the type field 402 in the MMTP packet header 400 (bit 10) can be used as the splicing point flag S 404. The header 400 also includes a RAP flag "R" 406, which implements the RAP flag as discussed above. The header can also include additional fields as shown in FIG. 4A, as defined in the standard and discussed further below.

The S flag 404 can signal a splicing point. For example, the splicing point flag S 404, when set to 1, indicates that the payload contains a splicing point to the data stream of that data type. Otherwise, when set to 0, the splicing point flag S 404 can indicate the payload does not contain a splicing point. The semantics of the S flag 404 can be further defined by the data type of the data stream. In some embodiments, when the S flag 404 is set to 1, a' 406 shall be set to 1. For example, as discussed above, R can be used to signal splicing points when imposing constraints. In some situations, this may reduce coding efficiency and/or require that the coding picture structure be predefined. Therefore, additional S signaling can be used to provide splicing support with better coding efficiency, can be used to support seamless splicing with additional signaling bits for the splicing points, and/or the like.

FIG. 4B shows a table 450 with exemplary values of the type field 402, according to some examples. The type 0x00 is an MPU, which is defined as a media-aware fragment of the MPU. The type 0x01 is a generic object, which is defined as a generic object such as a complete MPU or an object of another type. The type 0x02 is a signaling message, which is defined as one or more signaling messages or a fragment of a signaling message. The type 0x03 is a repair symbol, which is defined as a single complete repair symbol. Values of 0x04-0x0F are reserved for ISO use, and values of 0x10-0x1F are reserved for private use.

In some embodiments, additional bits can be used from the MMTP header (e.g., beyond just one bit, as discussed above) to signal splicing information. FIG. 5A shows a first version of the MMTP packet structure 500, according to some examples. FIG. 5B shows a second version of the MMTP packet structure 550, according to some examples. Both versions include a random access point (RAP) flag R 502. As explained above, the RAP flag R 502 may be used for fast session acquisition. The flag R 502, e.g., according to the MMT Implementation Guidelines, indicates that the payload contains a RAP to the data stream of that data type. A RAP can be MPU metadata, a signaling message, or frames that contain i-frames. For the MPU mode, the R flag 502 can be set (a) to mark data units of MPU fragment type values 0 and 1, (b) to mark MFUs that contain a sync sample or a fragment thereof, in the case of timed media, and (c) to mark the primary item of non-timed MPUs. The inventors have appreciated that the RAP flag a' does not necessarily indicate whether a random access point is a 'good' or 'safer' point for splicing MMT assets. This can be especially true for performing seamless splicing. Splicing two different data streams or MMT assets may involve signaling and handling possible decoding dependencies, decoding delay and decoding buffer fullness issues (e.g. buffer overflow). In some examples, such as for seamless splicing, it is also desirable to take care of quality continuity before and after the splicing point.

The techniques described herein provide for specifying or signaling splice opportunity information and splice point properties at the MMT packet level. The splice information can be specified for various splicing performances, including ordinary splicing and/or seamless splicing. Exposing the splicing information at the MMT packet level can allow splicing devices or MANE to quickly access the splicing related information, e.g., without needing to further parse down to the media data. Further, in some examples, additional splicing information may be added in the packet header.

FIG. 6A shows an exemplary syntax 600 to signal splicing information, according to some embodiments. The syntax 600, as discussed further below, generally unifies the MMTP packet structure 500 and the MMTP packet header structure 550 shown in FIGS. 5A and 5B, respectively. The syntax 600 also adds splicing support in the header. For example, as shown in FIG. 5A, bits 8 and 9 are reserved (RES) 504. The exemplary syntax 600 uses bits 8 and 9 for signaling QoS and splicing-related information. Additionally, as discussed further below, the functionality of the QoS Q field 552 shown in FIG. 5B is moved to the QoS_support_header field 606, as discussed further below. The syntax includes fields described in, for example, ISO/IEC 23008-1:2017, Part 1: MPEG Media Transport (MMT), which is hereby incorporated by reference herein in its entirety.

Bits 0-1 (2 bits) are the V field 602, which indicates the version number of the MMTP protocol. In some embodiments, this field is set to '00' to comply with the MPEG specification, and '01' for QoS support and splicing support. The flag Q 604 (1 bit) is the QoS_classifier_flag, such that if Q is set then have QoS. In some embodiments, when Q 604 is set to '1', it indicates that the QoS classifier information field QoS_support_header 606 (32 bits) is present in the syntax 600. The QoS classifier information field 606 can contain a number of different fields. FIG. 6B shows an example syntax 650 for the QoS support header 606, according to some embodiments. The syntax 650 includes a flow identifier flag F 652 (1 bit), which indicates whether flow identifier information is used (e.g., such that an application can perform per-flow QoS operations in which network resources are temporarily reserved during the session). The syntax 650 includes a reliability flag r 654 (1 bit), which indicates whether the data is loss tolerant (e.g., media data) or whether the data is not loss tolerant (e.g., signaling data, service data and/or program data). The syntax 650 includes a flow extension flag E 656 (1 bit), which can be used if there are more than 127 flows to indicate that additional byte(s) are used in the extension header. The syntax 650 includes a delay sensitivity field DS 658, which indicates the delay sensitivity of the data between end-to-end delivery for the given service (e.g., conversational service (~100 ms), live-streaming service (~1 s), and/or the like). The syntax 650 includes a type of bit rate field TB 660, which indicates the type of bit rate (e.g., constant and/or non-constant bit rate). The syntax 650 includes a transmission priority field TP 662, which indicates the QoS class property. For example, an application can perform per-class QoS operations according to the particular value of one property. For example, the class values are universal to all independent sessions.

Referring further to the syntax 600 shown in FIG. 6A, the syntax 600 includes a splicing point flag S 608 (1 bit) which can indicate whether there is splicing support. In some embodiments, when S 608 is set to '1', it indicates that splicing point information field, shown in the syntax 600 as the splicing_support_header 610 (32 bits) is present. FIG. 6C shows an exemplary syntax 680 for the splicing support header field 610, according to some embodiments. The syntax 680 for the splicing point information field contains three fields, namely the splicing point offset field sp_offset 682 (8 bits), the splicing point property field sp_property 684 (8 bits), and the decoding (presentation) timestamp offset field prst_timestamp_offset 686 (16 bits). In some embodiments, not all of the fields in the syntax 680 are used. For example, for timed data and seamless splicing, the sp_property field 684 and the prst_timestamp_offset field 686 are used; otherwise the two fields are set to 0.

The splicing point offset sp_offset 682 is an integer value that can be used as an offset that is added to the packet_sequence_number field 612 in FIG. 6A to count the number of packets before the splicing point. The resulting packet sequence number of the packet can indicate a splicing point which is after the last byte of that packet.

The sp_property 684 specifies splicing related properties for timed data. For example, the first two bits can specify the SAP type, and the remaining six bits can specify other information, such as the splice decoding delay, maximum splice bitrate, and splice quality etc. (e.g. the quality may consider the layered video coding cases including MVC and SVC). The splicing point property may be specified in a separate document, e.g., a new part of the standard ISO/IEC 23008 or ISO/IEC 23001-8 Coding independent code points. In some embodiments, a splicing device may decide to perform the splicing processing in terms of its capability of handling the SAP type and other properties.

The prst_timestamp_offset 686 can specify a presentation time offset to the MPU presentation time (mpu_presentation_time), which is in the MPU timestamp descriptor. The prst_timestamp_offset 686 can be the presentation time difference between the MPU and the AU with the earliest presentation time after the splicing point. The presentation time offset can be used in scenarios if, when putting the two together, there may be a delay, so it can be used to inform the splicing device of the offset.

With the above-described splicing information in MMTP packet header, a splicing device can find a closest splicing point and correctly perform splicing processing, e.g., when it is instructed by relevant messages from the MMT sending entity.

Error correction, such as application layer forward error correction (AL-FEC), can be used in conjunction with MMT. For example, in the current MPEG standard, AL-FEC is typically added on the MMTP packets for delivery over the IP networks. Therefore, performing splicing features often requires processing the FEC layer prior to being able to process the MMT packages. As discussed above, AL-FEC implementations may be independent of media data format, such that the FEC may be unaware of any data unit boundaries of the associated media data format. Therefore changing or splicing of MMT packages/asset on a given MMT packages may need to respect the existence of the AL-FEC implementation and may result in the AL-FEC decoding and re-coding. For example, U.S. patent application Ser. No. 15/912,413, titled "Methods and Apparatus for Signaling Asset Change Information for Media Content," filed Mar. 5, 2018, describes techniques for signaling whether error correction takes into account the structure of the underlying data content, which is hereby incorporated by reference herein in its entirety. The encoding device can signal whether the implemented error correction, including AL-FEC, is aware of media data unit boundaries such the AL-FEC source symbol block sizes will not cross the data unit boundaries. For example, if the encoding was performed in an AL-FEC manner, the boundaries of an MPU or MFU may serve as splicing points. If the AL-FEC implementation is data unit boundary aware, then a splicer can change or splice Assets without needing to perform AL-FEC processing. A parameter field for signaling the boundary awareness at the MMTP packet header may be designed as the data_unit_boudary_aware_FEC field, a one bit field. This one bit field may be assigned in the FEC types field FEC 614 shown in FIG. 6A, which is a two-bit field in the MMT packet header.

Figure 7:
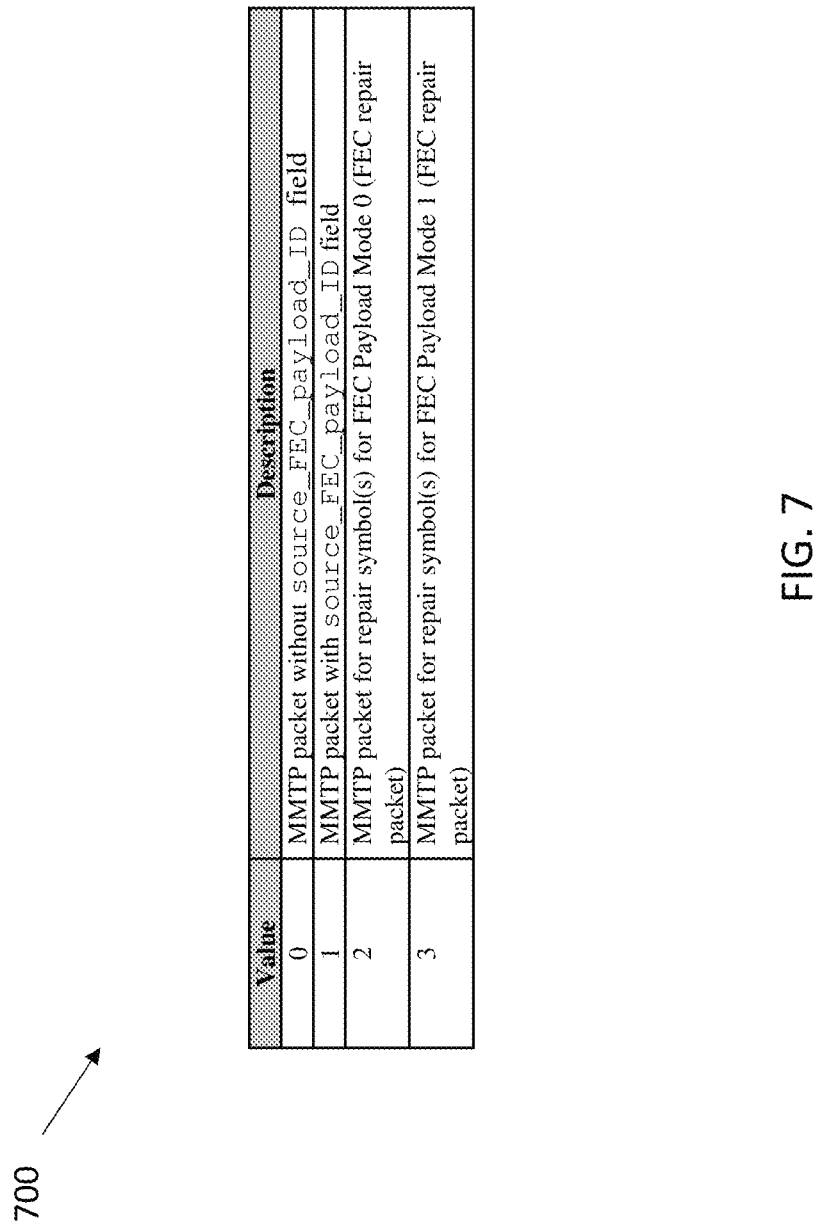
FIG. 7 shows an exemplary table of values of a forward error correction (FEC) types field, according to some embodiments.

FIG. 7 shows an exemplary table of values of FEC 614, according to some embodiments. The value of "0" indicates an MMTP packet without the source_FEC_payload_ID field (e.g., which is used only when the value of the FEC type is set to "1"). For example, if the FEC type 614 is set to 0, it can indicate that FEC is not applied to this MMT packet, and/or that FEC is applied to this MMT packet without adding the source_FEC_payload_ID. The value of "1" indicates an MMTP packet with the source_FEC_payload_ID. For example, if FEC type 614 is set to 1, it can indicate FEC is applied to the MMTP packet. The value of '2' indicates the MMTP packet for repair symbol(s) for FEC Payload Mode 0

In some embodiments, since the MMTP packet header can include both the 'FEC_types' field FEC 614 and the 'Type' field 616 (e.g., as shown in FIG. 6A), the values of '2' and '3' are redundant. For example, the values of '2' and '3' can be derived from the values of '0' and '1' when the 6-bit 'type' field 616 in the packet header indicates the repair symbol type of the packet from other data types. In some embodiments, if the values of '2' and '3' can be derived from other header information, then the values can be reserved and/or only a single bit can be used to indicate the values of '0' and '1.'

In some embodiments, the FEC Payload Modes 0 and 1 can be used to signal that both the source and repair packet include (or do not include) the source_FEC_payload_ID field. In some embodiments, such as shown in table 700 in FIG. 7, the values of '0' and '1' may signal for the repair symbol packets only. Thus, in some embodiments the source_FEC_payload_ID field may be signaled (in addition to repair symbol packets), while in some embodiments the source may not be signaled.

In some embodiments, the 2 bit FEC types field 614 may be split to two 1-bit fields. For example, the full set of two bits can indicate the type of the FEC scheme used for error protection of MMTP packets. The first bit can indicate the FEC type, and the second bit can indicate the data unit boundary awareness of the FEC. For example, bit 0 can be set to a value of '0' to signal that the FEC is not data unit boundary aware, or to a value of '1' to signal that the FEC is data unit boundary aware. As a further example, bit 1 can be set to '0' to indicate that FEC is not applied to this MMT packet, and/or that FEC is applied to this MMT packet without adding source_FEC_payload_ID, and the bit can be set to '1' to indicate that the MMT packet includes the source_FEC_payload_ID field.

Figure 8:
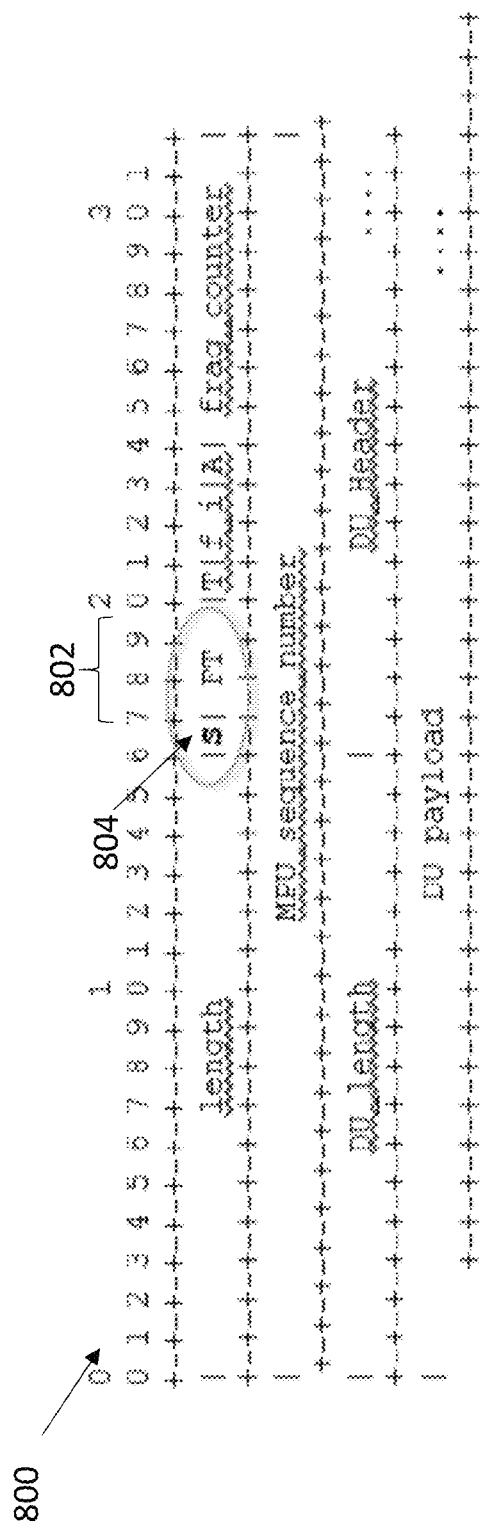
FIG. 8 shows an exemplary syntax of a portion of the MMTP payload header for MPU mode, according to some embodiments.

In some embodiments, the MMTP payload header for MPU mode can be used to signal splicing information. In some embodiments, portions of existing fields can be used for signaling, such as using one or more bits from an existing field that are reserved. FIG. 8 shows an exemplary syntax 800 of a portion of the MMTP payload header for MPU mode, according to some embodiments. As shown in the syntax 800, the first bit of the 'FT' field 802 in the MMTP payload header can be used as the splicing point flag 'S' 804 to signal a splicing point. Using this flag 'S' 804 therefore reduces the 'FT' field 802 to 3 bits. The bit used for S 804 can occupy a reserved bit in the FT field 802. For example, the FT value of 0 is for MPU metadata, and indicates that it contains the FTYP, MMPU, MOOV and meta boxes as well as any other boxes that appear in between. A FT value of 1 is for Movie fragment metadata, and indicates that it contains the MOOF box and the MDAT box, excluding all media data inside the MDAT ox but including any chunks of auxiliary sample information. A FT value of 2 is for an MFU, and indicates it contains a sample or sub-sample of timed media data or an item of non-timed media data. Values of 4-7 are reserved for private use. The splicing point flag S 804 can be set to '1' to indicate that the payload contains a splicing point to the data stream of that data type. The exact semantics of this flag can further be defined by the data type itself.

In some embodiments, the value of the splicing point flag S may influence (or be influenced) by other fields. For example, when the splicing point flag S 804 is set to '1', 'R' (e.g., the R field 502 in FIGS. 5A-5B, the R field 618 in FIG. 6A) can also be set to '1'. Thus, 'S' can be used to indicate a subset of random access points that are splicing points.

In some embodiments, splicing information can be signaled using another value for the MPU Fragment Type. FIG. 9 shows a table 900 of exemplary values for the FT field (e.g., the FT field 802 discussed in conjunction with FIG. 8), according to some embodiments. As discussed above and shown in the table 900, the FT value of 0 is for MPU metadata, and indicates that it contains the FTYP, MMPU, MOOV and meta boxes as well as any other boxes that appear in between. A FT value of 1 is for Movie fragment metadata, and indicates that it contains the MOOF box and the MDAT box, excluding all media data inside the MDAT ox but including any chunks of auxiliary sample information. A FT value of 2 is for an MFU, and indicates it contains a sample or sub-sample of timed media data or an item of non-timed media data. A new value of 3 can be added, which is to indicate the MFU as a splicing point, and indicates that it contains a sync sample or the first sub-sample of a sync sample of timed media data.

In some embodiments, the value of FT may influence (or be influenced) by other fields. For example, the value of "3" for the FT field may be signaled in the MMTP payload header for MPU mode for a splicing point when 'R' is set to '1' for a RAP (e.g., the R field 502 in FIGS. 5A-5B, the R field 618 in FIG. 6A).

Figure 10:
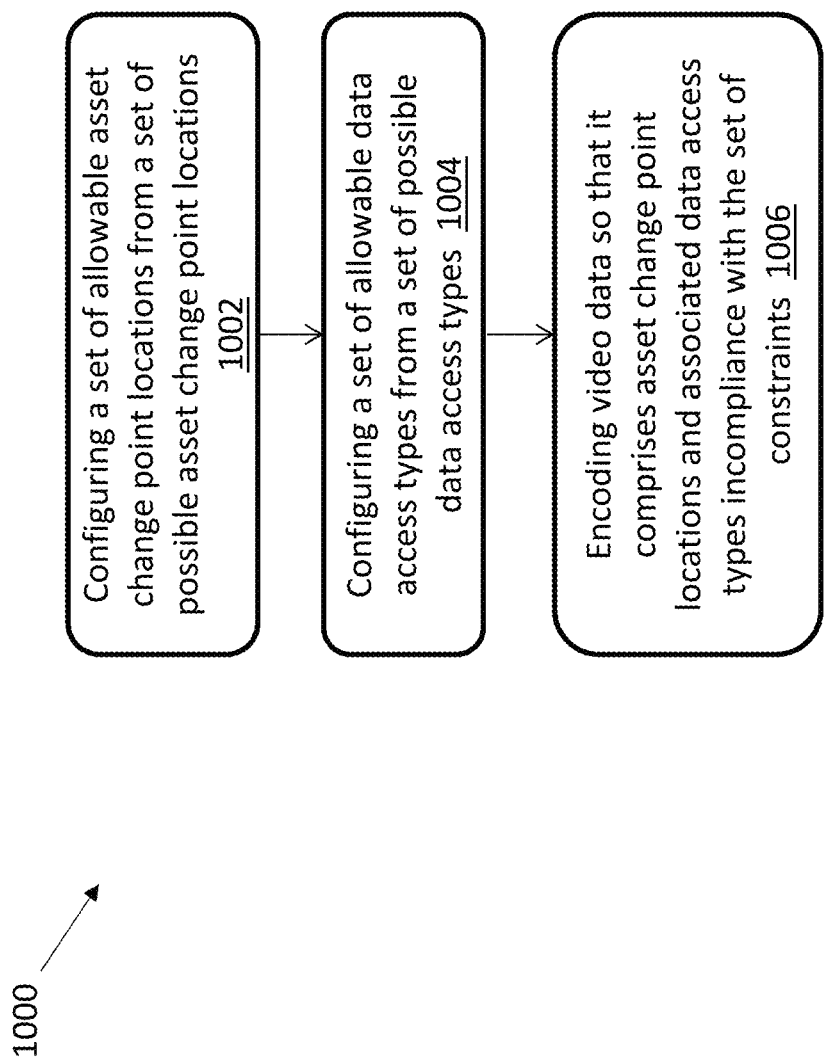
FIG. 10 shows an exemplary computerized method for encoding video according to a set of constraints, according to some embodiments.

FIG. 10 shows an exemplary computerized method 1000 for encoding video according to a set of constraints, according to some embodiments. At steps 1002-1004, an encoding module is configured to operate according to a set of constraints that constrain the encoding process for asset changes. At step 1002, the set of constraints configures a set of allowable asset change point locations from a set of possible asset change point locations. The set of allowable asset change point locations can be a subset of the set of possible asset change point locations. At step 1004, the set of constraints configures a set of allowable data access types from a set of possible data access types, wherein the set of allowable data access types is a subset of the set of possible data access types. At step 1006, video data is encoded by the encoding module based on the set of constraints to generate encoded first video data, such that the encoded first video data comprises a set of asset change point locations and associated data access types in compliance with the set of constraints.

Referring to steps 1002-1004, for example, the set of allowable asset change point locations can be configured to be asset change points at MPU boundaries, and the set of allowable data access types can be configured such that the first target MPU, the first designated MPU, or both, start with a SAP of a set of specified types. In some embodiments, the set of specified SAP types can include (a) a first type, in which all access units, in decoding order, can be correctly decoded, and an access unit in decoding order is also the first access unit in presentation order, and/or (b) a second type in which the first access unit in decoding order in the media stream is not the first access unit in presentation order. In some embodiments, at step 1006 the encoder can set a flag to mark a first SAP of the MPU.

Referring further to steps 1002-1004, for example, the set of allowable asset change point locations can be configured to be asset change points at a start of a SAP, and the set of allowable data access types such that the first target SAP, the first designated SAP, or both, are of a set of specified types. In some embodiments, the set of specified SAP types can include (a) a first type, in which all access units, in decoding order, can be correctly decoded, and an access unit in decoding order is also the first access unit in presentation order, and/or (b) a second type in which the first access unit in decoding order in the media stream is not the first access unit in presentation order. At step 1006, the encoder can set a flag to mark each SAP in the MPU. Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for encoding video data, comprising:
    configuring an encoding module to operate according to a set of constraints that constrain the encoding process for asset changes, wherein the set of constraints:
        configures a set of allowable asset change point locations from a set of possible asset change point locations, wherein the set of allowable asset change point locations is a subset of the set of possible asset change point locations; and
        configures a set of allowable data access types from a set of possible data access types for each asset change point location in the set of allowable asset change point locations, wherein:
            the set of allowable data access types comprises an allowable set of stream access point (SAP) types determined based on a change type provided in an associated Asset Change Request (ACR) message, wherein the change type comprises a replacement, an overlay, or an insertion; and
            the set of constraints configures, for each change type, the allowable set of SAP types for each asset change point location in the set of allowable asset change point locations, wherein:
                the allowable set of SAP types is a subset of a set of possible SAP types;
                the allowable set of SAP types configured for each asset change point location is the same or not based on the change type; and
                the allowable set of SAP types specify one or more starting points for access units in decoding order and in presentation order; and
    encoding, by the encoding module, video data using Moving Picture Experts Group (MPEG) media transport (MMT) protocol (MMTP) packets based on the set of constraints to generate encoded first MMT video data, comprising, for an MMTP packet of the encoded first MMT video data:
        setting one or more fields in a MMTP packet header of the MMTP packet to indicate an allowable asset change point from the set of allowable asset change points is present in an MMTP payload associated with the MMTP packet header,
    such that the encoded first MMT video data comprises a set of asset change point locations and associated data access types in compliance with the set of constraints.

2. The method of claim 1, wherein configuring the encoding module to operate according to the set of constraints that constrain the encoding process for asset changes comprises:
    configuring the set of allowable asset change point locations to be asset change points at Media Processing Unit (MPU) boundaries; and
    configuring the set of allowable data access types such that a first target MPU, a first designated MPU, or both, start with a SAP of a set of specified SAP types.

3. The method of claim 1, wherein configuring the encoding module to operate according to the set of constraints that constrain the encoding process for asset changes comprises:
    configuring the set of allowable asset change point locations to be asset change points at a start of a SAP; and
    configuring the set of allowable data access types such that a first target SAP, a first designated SAP, or both, are of a set of specified SAP types.

4. The method of claim 1, wherein setting one or more fields in the MMTP packet header comprises setting a random access point flag for the MMTP packet header of each packet associated with each asset change point location in a set of asset change point locations in the video data.

5. The method of claim 1, wherein:
    the set of possible asset change point locations comprises a Media Processing Unit (MPU) boundary and a start of a SAP; and
    the set of possible data access types comprises a set of SAP types for each asset change point location in the set of allowable asset change point locations.

6. The method of claim 1, wherein the set of constraints configures, (a) for each change type and (b) each change point location, the allowable set of SAP types for each asset change point location in the set of allowable asset change point locations.

7. The method of claim 2, wherein the set of specified SAP types comprises:
    a first type, in which all access units, in decoding order, can be correctly decoded, and an access unit in decoding order is also the first access unit in presentation order; and
    a second type in which the first access unit in decoding order in the media stream does not correspond to a first access unit in presentation order.

8. The method of claim 2, further comprising setting a flag to mark a first SAP of an MPU.

9. The method of claim 3, wherein the set of specified SAP types comprises:
    a first type, in which all access units, in decoding order, can be correctly decoded, and an access unit in decoding order is also the first access unit in presentation order; and
    a second type in which the first access unit in decoding order in the media stream does not correspond to a first access unit in presentation order.

10. The method of claim 3, further comprising setting a flag to mark each SAP in the MPU.

11. A method for encoding video data, comprising:
    encoding video data according to a set of constraints to generate encoded video data, wherein the set of constraints comprises:

a set of allowable asset change point locations from a set of possible asset change point locations, wherein the set of allowable asset change point locations is a subset of the set of possible asset change point locations; and a set of allowable data access types from a set of possible data access types for each asset change point location in the set of allowable asset change point locations, wherein:

the set of allowable data access types comprises an allowable set of Stream Access Point (SAP) types determined based on a change type provided in an associated Asset Change Request (ACR) message, wherein the change type comprises a replacement, an overlay, or an insertion; and the set of constraints configures, for each change type, the allowable set of SAP types for each asset change point location in the set of allowable asset change point locations, wherein:

the allowable set of SAP types is a subset of a set of possible SAP types;

the allowable set of SAP types configured for each asset change point location is the same or not based on the change type; and the allowable set of SAP types specify one or more starting points for access units in decoding order and in presentation order;

determining a set of asset change point locations in the encoded video data; and setting one or more fields at the Moving Picture Experts Group (MPEG) media transport protocol (MMTP) packet level to signal a set of asset change point locations, such that a receiving device can use the signaled information at the MMTP packet level to determine the set of asset change point locations to perform an asset change.

12. The method of claim 11, wherein setting the one or more fields comprises setting a bit in a type field of an MMTP packet header of each packet associated with each asset change point location in the set of asset change point locations.

13. The method of claim 11, wherein setting the one or more fields comprises setting a plurality of bits of an MMTP packet header of each packet associated with each asset change point location in the set of asset change point locations.

14. The method of claim 11, wherein setting the one or more fields comprises setting a bit in an MMTP payload header of each packet associated with each asset change point location in the set of asset change point locations.

15. The method of claim 11, wherein setting the one or more fields comprises signaling a value of a Media Processing Unit (MPU) fragment type.

16. The method of claim 11, wherein:

the set of possible asset change point locations comprises a Media Processing Unit (MPU) boundary and a start of a SAP; and the set of possible data access types comprises a set of SAP types for each asset change point location in the set of allowable asset change point locations.

17. An apparatus for encoding video data, the apparatus comprising a processor in communication with memory, the processor being configured to execute instructions stored in the memory that cause the processor to:

configure the processor to operate according to a set of constraints that constrain the encoding process for asset changes, wherein the set of constraints:

configures a set of allowable asset change point locations from a set of possible asset change point locations, wherein the set of allowable asset change point locations is a subset of the set of possible asset change point locations; and configures a set of allowable data access types from a set of possible data access types for each asset change point location in the set of allowable asset change point locations, wherein:

the set of allowable data access types comprises an allowable set of Stream Access Point (SAP) types determined based on a change type provided in an associated Asset Change Request (ACR) message, wherein the change type comprises a replacement, an overlay, or an insertion; and the set of constraints configures, for each change type, the allowable set of SAP types for each asset change point location in the set of allowable asset change point locations, wherein:

the allowable set of SAP types is a subset of a set of possible SAP types;

the allowable set of SAP types configured for each asset change point location is the same or not based on the change type; and the allowable set of SAP types specify one or more starting points for access units in decoding order and in presentation order; and encode video data using Moving Picture Experts Group (MPEG) media transport (MMT) protocol (MMTP) packets based on the set of constraints to generate encoded first MMT video data, comprising, for an MMTP packet of the encoded first MMT video data:

setting one or more fields in a MMTP packet header of the MMTP packet to indicate an allowable asset change point from the set of allowable asset change points is present in an MMTP payload associated with the MMTP packet header, such that the encoded first MMT video data comprises a set of asset change point locations and associated data access types in compliance with the set of constraints.

18. The apparatus of claim 17, wherein configuring the processor to operate according to the set of constraints that constrain the encoding process for asset changes comprises:

configuring the set of allowable asset change point locations to be asset change points at Media Processing Unit (MPU) boundaries; and configuring the set of allowable data access types such that a first target MPU, a first designated MPU, or both, start with a SAP of a set of specified SAP types.

19. The apparatus of claim 17, wherein configuring the processor to operate according to the set of constraints that constrain the encoding process for asset changes comprises:

configuring the set of allowable asset change point locations to be asset change points at a start of a SAP; and configuring the set of allowable data access types such that a first target SAP, a first designated SAP, or both, are of a set of specified access types.

20. The apparatus of claim 17, wherein:

the set of possible asset change point locations comprises a Media Processing Unit (MPU) boundary and a start of a SAP; and the set of possible data access types comprises a set of SAP types for each asset change point location in the set of allowable asset change point locations.

21. An apparatus for performing an asset change for video data, the apparatus comprising a processor in communication with memory, the processor being configured to execute instructions stored in the memory that cause the processor to:
receive encoded video data encoded according to a set of constraints comprising:
a set of allowable asset change point locations from a set of possible asset change point locations, wherein the set of allowable asset change point locations is a subset of the set of possible asset change point locations; and
a set of allowable data access types from a set of possible data access types for each asset change point location in the set of allowable asset change point locations, wherein:
the set of allowable data access types comprises an allowable set of Stream Access Point (SAP) types determined based on a change type provided in an associated Asset Change Request (ACR) message, wherein the change type comprises a replacement, an overlay, or an insertion; and
the set of constraints configures, for each change type, the allowable set of SAP types for each asset change point location in the set of allowable asset change point locations, wherein:
the allowable set of SAP types is a subset of a set of possible SAP types;
the allowable set of SAP types configured for each asset change point location is the same or not based on the change type; and
the allowable set of SAP types specify one or more starting points for access units in decoding order and in presentation order;
determine, based on one or more fields at the Moving Picture Experts Group (MPEG) media transport protocol (MMTP) packet level, a set of asset change point locations; and
perform, using one or more asset change point locations from the set of asset change point locations, an asset change operation.

22. The apparatus of claim 21, wherein:
the set of possible asset change point locations comprises a Media Processing Unit (MPU) boundary and a start of a SAP; and
the set of possible data access types comprises a set of SAP types for each asset change point location in the set of allowable asset change point locations.

* * * * *